United States Patent
Chen et al.

(10) Patent No.: US 11,910,260 B2
(45) Date of Patent: Feb. 20, 2024

(54) CELL SELECTION METHOD AND DEVICE, USER EQUIPMENT, AND STORAGE MEDIUM

(71) Applicant: BEIJING XIAOMI MOBILE SOFTWARE CO., LTD., Beijing (CN)

(72) Inventors: Wei Chen, Beijing (CN); Guangkuo Niu, Beijing (CN); Xinnan Wu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 309 days.

(21) Appl. No.: 17/354,915

(22) Filed: Jun. 22, 2021

(65) Prior Publication Data
US 2022/0240149 A1    Jul. 28, 2022

(30) Foreign Application Priority Data
Jan. 25, 2021  (CN) .......................... 202110099306.7

(51) Int. Cl.
*H04W 36/00*  (2009.01)
*H04W 36/30*  (2009.01)

(52) U.S. Cl.
CPC ..... *H04W 36/30* (2013.01); *H04W 36/00837* (2018.08)

(58) Field of Classification Search
None
See application file for complete search history.

(56) References Cited

U.S. PATENT DOCUMENTS

| | | | |
|---|---|---|---|
| 2012/0028676 A1 | 2/2012 | He | |
| 2014/0031036 A1 | 1/2014 | Koo | |
| 2014/0105181 A1* | 4/2014 | Milam | H04W 36/0027 370/332 |
| 2014/0364129 A1 | 12/2014 | Xiao et al. | |
| 2015/0141021 A1 | 5/2015 | Kapoulas et al. | |
| 2015/0201360 A1 | 7/2015 | Ray Chaudhuri et al. | |
| 2016/0021673 A1 | 1/2016 | Ahmadzadeh et al. | |
| 2016/0095026 A1* | 3/2016 | Boudreau | H04W 36/30 370/331 |

(Continued)

FOREIGN PATENT DOCUMENTS

| | | |
|---|---|---|
| CN | 103718606 A | 4/2014 |
| CN | 103889010 A | 6/2014 |
| CN | 104041116 A | 9/2014 |

(Continued)

OTHER PUBLICATIONS

European Search Report in European application No. 21182418.0, dated Dec. 22, 2021,(11p).

(Continued)

*Primary Examiner* — Suhail Khan
(74) *Attorney, Agent, or Firm* — Arch & Lake LLP

(57) ABSTRACT

The embodiments of the disclosure relate to a cell selection method and device, user equipment (UE), and a storage medium. The cell selection method may include: a parameter value of a transmission link allocated to the UE by a network side is acquired; and responsive to determining, according to the parameter value, that the transmission link allocated to the UE does not support a transmission requirement of a present service scenario of the UE, cell selection of the UE is triggered.

18 Claims, 3 Drawing Sheets

(56) References Cited

U.S. PATENT DOCUMENTS

2016/0360465 A1 12/2016 Kapoulas et al.
2017/0150415 A1 5/2017 Kapoulas et al.

FOREIGN PATENT DOCUMENTS

| CN | 108076489 A | 5/2018 |
| CN | 110268746 A | 9/2019 |
| CN | 111510994 A | 8/2020 |
| CN | 111770540 A | 10/2020 |
| WO | 2012044328 A1 | 4/2012 |

OTHER PUBLICATIONS

First Office Action of the Chinese Application No. 202110099306.7, dated Aug. 1, 2022, (16p).

* cited by examiner

CELL SELECTION METHOD AND DEVICE, USER EQUIPMENT, AND STORAGE MEDIUM

CROSS-REFERENCE TO RELATED APPLICATION

This application is based upon and claims priority to Chinese Patent Application No. 202110099306.7, filed on Jan. 25, 2021, the entire content of which is incorporated herein by reference for all purposes.

TECHNICAL FIELD

The disclosure generally relates to the technical field of wireless communications, and more particularly, to a cell selection method and device, user equipment (UE), and a storage medium.

BACKGROUND

Due to a network optimization configuration, in a communication process of an existing network, UE may still reside in a present serving cell under the condition that the signal quality of the present serving cell is relatively high but the communication quality (for example, a signal to noise ratio (SNR)) is relatively poor. However, under this condition, there may exist poor communication quality such as a long communication delay and/or a high packet loss rate for the UE.

SUMMARY

A first aspect of the disclosure provides a cell selection method, which may be applied to UE and include: acquiring a parameter value of a transmission link allocated to the UE by a network side; and triggering cell selection of the UE responsive to determining, according to the parameter value, that the transmission link allocated to the UE does not support a transmission requirement of a present service scenario of the UE.

A second aspect of the disclosure provides a cell selection device, which may be applied to UE and include: a processor and a memory for storing instructions executable by the processor; and the processor is configured to acquire a parameter value of a transmission link allocated to the UE by a network side; and trigger cell selection of the UE responsive to determining, according to the parameter value, that the transmission link allocated to the UE does not support a transmission requirement of a present service scenario of the UE.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
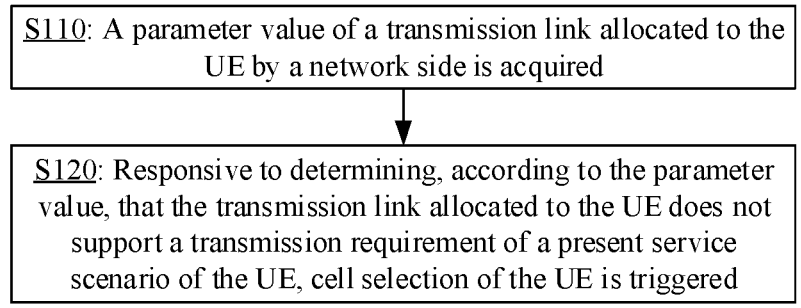
FIG. 1 is a flow chart showing a cell selection method, according to an exemplary embodiment.

As illustrated in FIG. 1, an embodiment of the disclosure provides a cell selection method. The method is applied to UE, and includes the following operations.

At S110, a parameter value of a transmission link allocated to the UE by a network side is acquired.

At S120, responsive to determining, according to the parameter value, that the transmission link allocated to the UE does not support a transmission requirement of a present service scenario of the UE, cell selection of the UE is triggered.

The UE may be various types of terminals, such as a mobile phone or tablet computer held by a user, a wearable device worn by the user, a vehicle-mounted device, or an intelligent device. The intelligent device includes, but not limited to, a smart home device, an intelligent home appliance, an intelligent office device, and/or an intelligent teaching device.

The network side includes the parameter value of the transmission link allocated to the UE by an access network for cellular mobile communication. The parameter value includes, but not limited to, a base station that the UE accesses. Here, the base station may at least include an anchor base station of the UE and the like.

The resource parameter value indicates a communication resource quantity corresponding to the transmission link, a delay and/or channel quality of the transmission link, etc.

The base station may allocate the transmission link for wireless communication to the UE in a resource scheduling manner. Exemplarily, before data transmission, the UE may send a resource scheduling request (SR), and the base station may allocate a resource of a UL and/or a downlink to the UE after receiving the SR. The base station may return resource configuration information to the UE after completing resource allocation. The resource configuration information is a scheduling response to the SR. Then, the UE may know a present condition of the transmission link allocated to the UE by the network side.

The transmission link allocated to the UE may include a UL and/or a downlink (that is, at least one of the UL or the downlink). The UL is configured for UL transmission, and the downlink is configured for downlink transmission.

Here, that the transmission link allocated to the UE does not support the transmission requirement of the present service scenario of the UE includes at least one of the following: a transmission resource of the transmission link allocated to the UE cannot support a resource quantity required by transmission of the present service scenario of the UE; or transmission quality of the transmission link allocated to the UE cannot support quality of service (QoS) of the present service scenario of the UE.

If the transmission link presently allocated to the UE cannot support the transmission requirement of the present service scenario of the UE, various phenomena such as interruption of transmission, packet loss during transmission, and high transmission error bit rate may occur.

A reason why the transmission resource allocated to the UE by the network side cannot support the transmission requirement of the present service scenario of the UE may be overloading, resource shortage and the like of a serving cell where the UE is presently located. In such case, if the UE keeps residing in the present serving cell, various phenomena of poor communication quality in the present service scenario of the UE may be caused.

In view of this, in the embodiment of the disclosure, the UE, when detecting that the transmission link presently allocated to the UE cannot support the transmission requirement of the present service scenario of the UE, may actively enter a cell selection flow of the UE, thereby selecting another more suitable cell to improve the wireless communication quality of the UE.

In the embodiment of the disclosure, cell selection refers to selection of the serving cell of the UE that is involved. Here, cell selection includes, but not limited to, cell reselection and/or cell handover of the UE.

If cell selection refers to cell reselection, the UE, when determining that the presently allocated transmission link cannot support the transmission requirement of the present service scenario, directly performs cell reselection, and reselects another cell except the present serving cell.

If cell selection refers to cell handover, the UE sends a handover request of requesting for cell handover to the base station of the network side when determining that the allocated transmission link cannot support the transmission requirement of the present service scenario. The base station of the network side negotiates with a base station of a target cell to be accessed by the UE after receiving the handover request, and may receive a handover response returned by the network side when the target base station allows access of the UE. The handover response may include various parameters for access of the UE to the target cell, thereby implementing serving cell handover of the UE.

Figure 2:
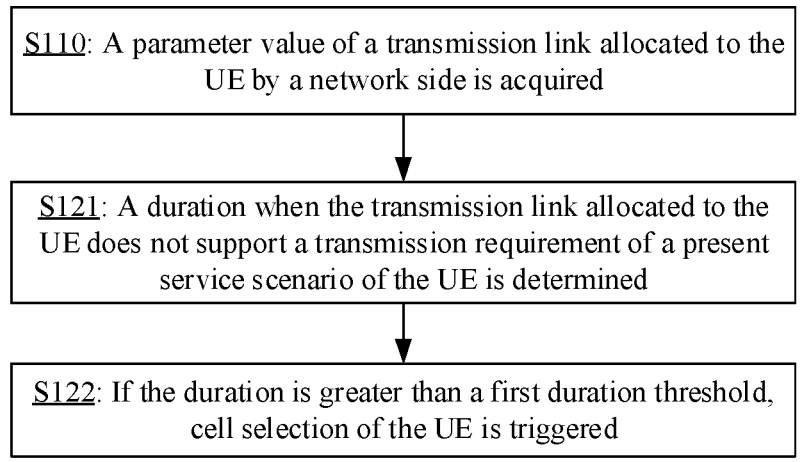
FIG. 2 is a flow chart showing a cell selection method, according to an exemplary embodiment.

In an embodiment, as illustrated in FIG. 2, the operation S120 may further include the following operations.

At S121, a duration when the transmission link allocated to the UE does not support the transmission requirement of the present service scenario of the UE is determined.

At S122, if the duration is greater than a first duration threshold, cell selection of the UE is triggered.

As such, unnecessary cell selection caused by the fact that the duration when the transmission link allocated to the UE does not support the transmission requirement of the present service scenario of the UE is too short is reduced.

Exemplarily, according to resource allocation of the transmission link, if the transmission requirement of the present service scenario is not met within present 0.1 second, but the condition that the transmission link presently allocated to the UE does not support the transmission requirement of the present service scenario of the UE may not last after 0.1 second due to a change of resource allocation and/or reduction of burst traffic of the present service scenario, cell selection of the UE may not be triggered, to reduce unnecessary cell selection.

In some embodiments, the transmission link includes a UL and a downlink.

The operation that cell selection of the UE is triggered responsive to determining, according to the parameter value, that the transmission link allocated to the UE does not support the transmission requirement of the present service scenario of the UE includes: responsive to determining, according to the parameter value, that at least one of the UL or the downlink allocated to the UE does not support the transmission requirement of the present service scenario of the UE, cell selection of the UE is triggered.

Different service scenarios have different requirements on the UL and the downlink. The following specific conditions are included.

In a first condition, a requirement of a service scenario on the downlink is much higher than a requirement on the UL. For example, in a video watching scenario, a present transmission requirement of the UE on the downlink is higher than a transmission requirement on the UL. Under this condition, the operation S120 may include: whether the downlink presently allocated to the UE supports a downlink resource quantity and/or downlink QoS required by the video watching scenario is independently determined according to the parameter value of the downlink allocated to the UE by the network side; if NO, the UE may be triggered to perform cell selection even though reference signal quality of the present serving cell supports a condition of keeping residing in the present serving cell. If the present transmission link allocated to the UE may support the transmission requirement of the present service scenario, and the reference signal quality of the present serving cell does not support another cell triggering condition, the UE may keep residing in the present serving cell. Therefore, unnecessary cell handover of the UE is reduced.

In a second condition, a requirement of a service scenario on the UL is much higher than that on the downlink, for example, a live broadcast scenario. In the live broadcast scenario, the UE needs to upload a presently recorded video. Under this condition, the operation S120 may include: whether the UL presently allocated to the UE supports a UL resource quantity and UL QoS required by the live broadcast scenario is independently determined according to the parameter value of the UL allocated to the UE by the network side; if NO, the UE may be triggered to perform cell selection even though the reference signal quality of the present serving cell supports the condition of keeping residing in the present serving cell. If the present transmission link allocated to the UE may support the transmission requirement of the present service scenario, and the reference signal quality of the present serving cell does not support another cell triggering condition, the UE may keep residing in the present serving cell. Therefore, unnecessary cell handover of the UE is reduced.

In a third condition, a service scenario has certain transmission requirements on both the UL and the downlink, for example, an online game scenario. In the online game scenario, the UE may have relatively high transmission requirements, for example, high transmission delay requirements, on both the UL and the downlink during massive data uploading and data downloading. Under this condition, the operation S120 may include: whether the UL supports a transmission requirement of the online game scenario and whether the downlink supports the transmission requirement of the online game scenario are determined respectively according to the parameter values of the UL and downlink allocated to the UE by the network side; and if the UL does not support the UL transmission requirement of the game scenario and/or the downlink does not support the downlink transmission requirement of the game scenario, it may be determined that the transmission link allocated to the UE does not support the transmission requirement of the present service scenario, and the UE may be triggered to perform cell selection.

Therefore, in an embodiment, the operation that a resource parameter allocated to the UE by the network side is acquired includes acquiring at least one of: a parameter value of the downlink allocated to the UE by the network side; or a parameter value of the UL allocated to the UE by the network side.

For example, resource configurations of the UL and/or downlink allocated to the UE by the network side are read to acquire the parameter values.

In another embodiment, if the UE preempts a resource based on a contention mechanism to perform data transmission of the present service scenario, it is determined, according to the resource quantity of a contention resource pool pre-divided by the network side and a contention condition, that a transmission link corresponding to the contention resource pool is the transmission link allocated to the UE by the network side. As such, the UE may further determine whether the transmission link corresponding to the contention resource pool supports the transmission requirement of the present service scenario of the UE.

In an embodiment, the parameter value of the downlink includes at least one of: RSRP of the downlink; an SNR of the downlink; or a bit error rate of the downlink.

In another embodiment, the parameter value of the UL includes at least one of: a UL grant of the UL; a BSR to be transmitted through the UL; a CQI of the UL; a link loss of the UL; or an MCS of the UL.

When there are multiple parameter values for at least one of the UL or the downlink, the multiple parameter values may be compared with parameter values of corresponding parameters capable of meeting the transmission requirement of the present service scenario; and if one practically allocated parameter value of the UL and/or downlink cannot reach the parameter value of the corresponding parameter capable of meeting the transmission requirement of the present service scenario, it may be determined that the corresponding link allocated to the UE does not support the transmission requirement of the present service scenario of the UE.

In some other embodiments, multiple parameter values of a link may be multiplied by corresponding weights, a sum of multiple weighted values is calculated to obtain an estimated value of the link, whether the estimated value of the link reaches a threshold corresponding to the transmission requirement of the present service scenario is determined by comparison, if YES, it is determined that the transmission link presently allocated to the UE supports the transmission requirement of the present service scenario of the UE, otherwise it may be determined that the transmission link presently allocated to the UE does not support the transmission requirement of the present service scenario of the UE.

Figure 3:
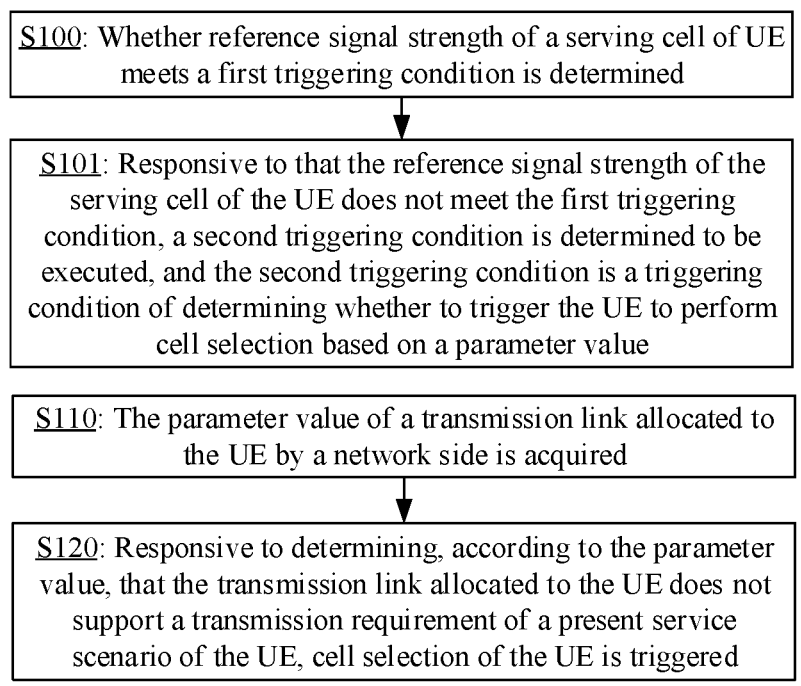
FIG. 3 is a flow chart showing a cell selection method, according to an exemplary embodiment.

In some embodiments, as illustrated in FIG. 3, the method further includes the following operations.

At S100, whether reference signal strength of a serving cell of the UE meets a first triggering condition is determined.

At S101, responsive to that the reference signal strength of the serving cell of the UE does not meet the first triggering condition, a second triggering condition is determined to be executed, and the second triggering condition is a triggering condition of determining whether to trigger the UE to perform cell selection based on the parameter value.

For the first triggering condition, whether the reference signal quality of the serving cell meets the first triggering condition is, for example, whether RSRP is less than an RSRP threshold, or whether reference signal received quality (RSRQ) is less than an RSRQ threshold. If the RSRP is less than the RSRP threshold, or the RSRQ is less than the RSRQ threshold, it may be determined that the first triggering condition is met. If the RSRP is not less than the RSRP threshold or the RSRQ is not less than the RSRQ threshold, it may be determined that the first triggering condition is not met.

Here, a reference signal of the serving cell includes, but not limited to, a synchronization signal, and/or a tracking reference signal, and/or a channel state information reference signal, etc.

If the reference signal strength of the reference signal of the serving cell does not meet the first triggering condition, it indicates that a measurement result of the reference signal of the present serving cell is relatively good, and the UE may keep residing in the present serving cell in terms of the first triggering condition. Therefore, whether serving cell handover needs to be performed is determined in combination with whether the transmission link supports the present transmission scenario of the UE.

In some other embodiments, the operation S120 may include: responsive to that the reference signal strength of the serving cell of the UE does not meet the first triggering condition and the present service scenario of the UE is a preset service scenario, the second triggering condition is determined to be executed.

In some service scenarios, the UE has no special requirement on its own resource consumption or the transmission quality of the transmission link, and in such case, whether the second triggering condition is met does not need to be judged to trigger the UE to perform cell selection.

In some scenarios, a volume of transmitted service data is relatively small and/or a requirement on a transmission delay is relatively low. For example, in a short message sending and receiving scenario, a data volume of a short message is small and a requirement on a delay is relatively low. In another example such as a mail sending and receiving scenario, even though the reference signal strength of the serving cell of the UE does not meet the first triggering condition, there is no need to determine whether the second triggering condition is met, so that operations of the UE for cell selection are simplified.

In some embodiments, the first triggering condition may include an S criterion and/or R criterion in the related art. The S criterion and the R criterion are triggering rules for triggering cell selection of UE based on a measured value of a reference signal, and cell selection is performed based on the measured value of the reference signal. Here, the measured value of the reference signal may include reference signal strength. The reference signal strength includes, but not limited to, RSRP and/or RSRQ.

In an embodiment, the operation that the second triggering condition is determined to be executed responsive to that the reference signal strength of the serving cell of the UE does not meet the first triggering condition may include: responsive to that the reference signal strength of the serving cell of the UE does not meet the first triggering condition and a difference between reference signal strength of a neighbor cell and the reference signal strength of the serving cell is detected to be in a preset range, cell selection of the UE is triggered.

If the reference signal strength of the present neighbor cell is too low, the UE may perform handover back to the present serving cell rapidly based on the first triggering condition after handover to the neighbor cell. As such, ping-pong handover may be formed. If the difference between the reference signal strength of the neighbor cell and the reference signal strength of the serving cell is relatively small, the phenomenon that the UE returns to the present serving cell after selecting the neighbor cell may be reduced.

The preset range may be determined according to experimental data or historical data. Exemplarily, the preset range may be 0 to 8 dB, or 3 to 5 dB.

In an embodiment, the operation S120 may further include: whether a duration when the UE is in the preset service scenario reaches a second duration threshold is determined according to historical running data of the UE; and if the duration when the UE is in the preset service scenario reaches the second duration threshold, responsive to that the reference signal strength of the serving cell of the UE does not meet the first triggering condition and the present service scenario of the UE is the preset service scenario, the second triggering condition is determined to be executed.

If the UE is in the preset service scenario of the UE for a short time, there is a relatively high probability that cell selection does not need to be performed. As such, unnecessary cell selection of the UE may still be reduced.

In the embodiment of the disclosure, the first duration threshold and the second duration threshold may be the same or different, and specific values may be determined according to experimental data or in a manner of ensuring a good user experience of imperceptibility.

In some embodiments, the method further includes: responsive to that the present service scenario of the UE is not the preset service scenario, the first triggering condition is determined to be executed.

In an embodiment, the preset service scenario includes at least one of the following: the UE has started an application in a preset application list; the UE has activated a function in a preset function list; or a preset phenomenon that the transmission requirement of the present service scenario is not met occurs during present running of the UE.

The preset application list may be a white list. Various applications with low transmission delay tolerances and/or high transmission bandwidth requirements are listed in the white list, such as a conference application, a game application, a live broadcast application and the like.

In some cases, the UE may perform the same function that causes a high transmission resource consumption for multiple applications, for example, foreground and/or background multimedia information playing of multiple applications of the UE.

In some cases, the preset phenomenon that the transmission requirement of the present service scenario is not met occurs during present running of the UE in the present scenario. For example, the phenomenon that multimedia information is played not so fluently, a packet loss rate is higher than a packet loss rate corresponding to the present service scenario, or a bit error rate is higher than a bit error rate corresponding to the present service scenario occurs. In an embodiment, the preset phenomenon that the transmission requirement of the present service scenario is not met occurring during present running of the UE includes at least one of the following: a buffer queue of a present data packet to be transmitted of the UE is full; a packet loss phenomenon occurs to the buffer queue of the present data packet to be transmitted of the UE; the packet loss phenomenon occurs when the UE receives a data packet; a transmission delay of a data packet transmitted by the UE reaches a preset delay value; a nonfluency phenomenon occurs when a UI of the UE is switched; or the nonfluency phenomenon occurs when multimedia information is played through a play window in the UI of the UE.

For example, many data packets are generated in the present service scenario of the UE, these data packets being cached in the buffer queue. Then, the data packets are extracted from the buffer queue for sending. If a transmission rate of the transmission link is low, the buffer queue may get full, or the packet loss phenomenon and the like may occur to the buffer queue.

The nonfluency phenomenon occurs to the UI, that is, there is a relatively long delay when the UI is switched from one interface to another interface.

In some cases, there is the play window in the UI, an audio and/or video may be played in the play window, and whether the video and/or audio may be played fluently in the audio and/or video play window is determined.

In some embodiments, the method further includes: when the reference signal strength of the serving cell of the UE meets the first triggering condition, cell selection of the UE is triggered.

In an embodiment, if the reference signal strength of the serving cell where the UE is presently located is too low, the UE may be triggered directly based on the judgment about the first triggering condition to perform cell selection without performing judgment about the second triggering condition. As such, the UE may be triggered to perform cell selection under at least one of the conditions that the reference signal strength of the serving cell is not so high and the transmission link allocated to the UE does not meet the transmission requirement of the present service scenario.

In another embodiment, the method may further include: the transmission requirement of the present service scenario of the UE is determined according to preset information.

The preset information includes at least one of: present running information of the present service scenario; historical running information of the present service scenario; operational behavior information in the present service scenario; or attribute information of the present service scenario, the attribute information at least including an application type of an application corresponding to the present service scenario.

For example, the transmission requirement is determined according to the present running information of the present service scenario, such as a volume of generated service data and/or a volume of data to be transmitted. In an example, the volume of generated service data and the characteristics of the data flow may be estimated according to the present service, such as large packets, small packets, delay or bandwidth requirements; and then transmission mode and the transmission requirement can be determined.

For another example, whether the transmission link allocated to the UE under a historical running condition meets the transmission requirement of the present service scenario, or a link condition of a historical transmission link meeting the transmission requirement of the present service scenario may be known according to the historical running information of the present service scenario, thereby predicting or directly determining a transmission link meeting the transmission requirement of the present service scenario. The historical running information may include a volume of generated service data and/or a volume of data transmitted in the previous time period, which may be a minute, a second, etc. The historical running information may be included in a historical experience database, for example, when similar services were used before, an experience value of a probability feature of the data stream may be used, such as compare packet sizes, delays, and the like.

The attribute information of the present service scenario may at least include an application type of an application started in the present service scenario, and/or, an application type of an application started in foreground in the present service scenario, etc.

In a word, any abovementioned preset information may be configured to determine whether the transmission link presently allocated to the UE meets the transmission requirement of the present service scenario.

Figure 4:
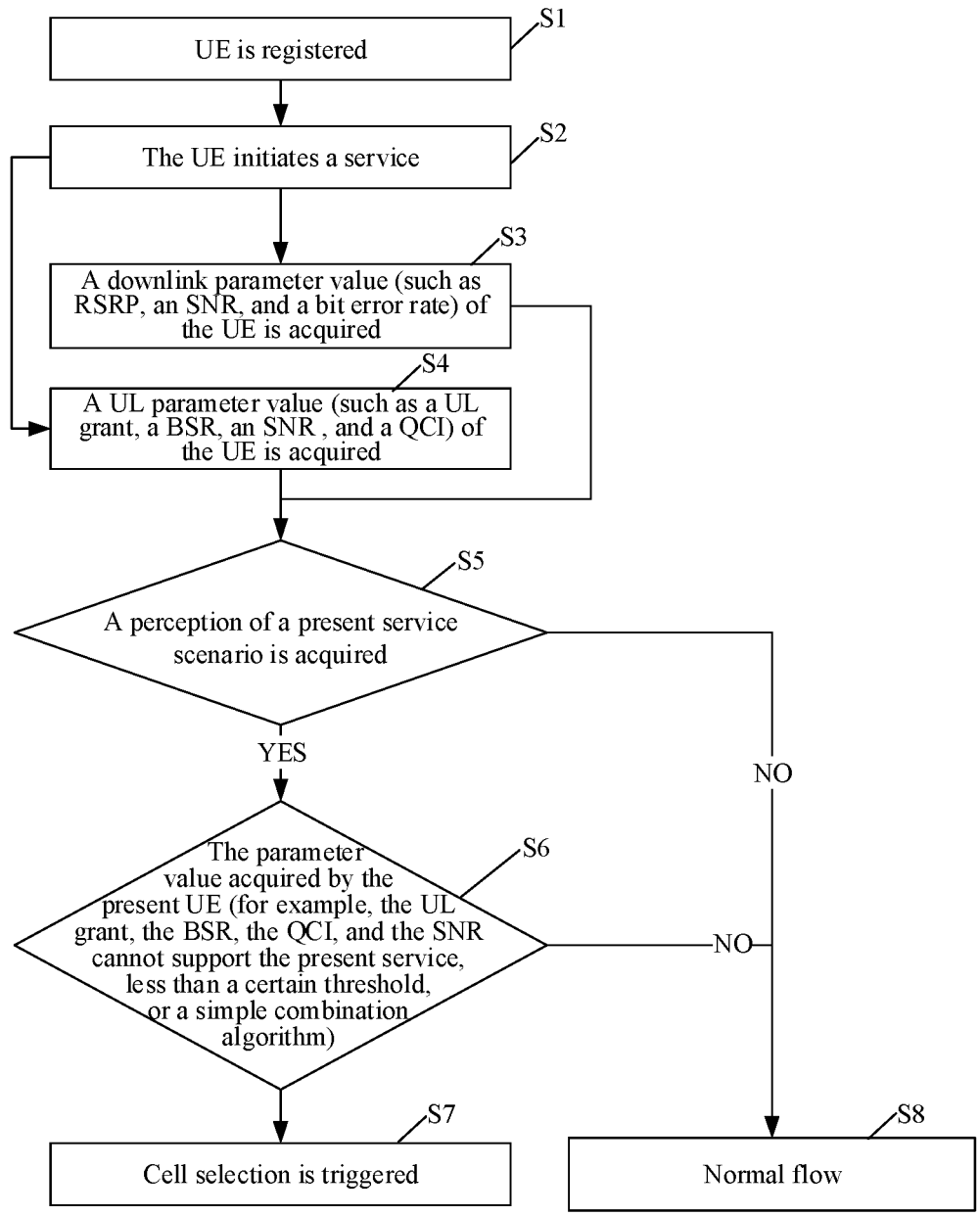
FIG. 4 is a flow chart showing a cell selection method, according to an exemplary embodiment.

An embodiment of the disclosure provides a cell selection method, which may be as follows. The S criterion/R criterion is not for the condition that, in a service scenario of UE in a connected state, the mobile phone signal/quality is relatively good, but relatively few downlink resources are allocated by a network, and the user experience is still poor. In the embodiment of the disclosure, optimization made for the scenario is mainly extension for cell selection, which is applicable to a dynamic perception scenario. If a UE parameter of the present UE is poor, a cell selection process is actively initiated. As illustrated in FIG. 4, the following operations may specifically be performed.

At S1, UE is registered.

At S2, the UE initiates a service.

At S3, a downlink parameter value, such as RSRP, an SNR, and a bit error rate, of the UE is acquired.

At S4, a UL parameter value, such as a UL grant, a BSR, a QCI, and an SNR, of the UE is acquired.

At S5, a present service state of the UE is intelligently acquired (whether nonfluent, whether congested, whether the delay is too long, and other states).

At S6, if the UE is presently in a non-service state, cell selection is performed according to a normal flow.

At S7, if the UE is presently in a service state, whether to initiate a cell selection process is comprehensively judged according to the service state at S5, a UL resource parameter of the UE at S4, a historical empirical threshold, a behavioral habit of a user, etc.

At S8, the cell selection process is triggered, and a service is recovered to normal.

According to the cell selection method provided in the embodiment of the disclosure, the condition that the communication quality is not so good or is not the best due to the fact that the UE keeps residing in the present serving cell if the reference signal strength of the serving cell is a little bit higher than the reference signal strength of the neighbor cell but the neighbor cell is higher in SNR or includes richer transmission resources may be reduced, so that the communication quality of the UE is improved. For example, the phenomenon of word loss or broken voice in a voice communication process may be reduced, the phenomenon that multimedia information and/or a page cannot be refreshed may be reduced, and the data and voice experiences of the UE are improved.

In addition, according to the cell selection method provided in the embodiment of the disclosure, when it is determined, in a service interaction process of the UE according to the parameter value dynamically measured or acquired by the UE in the connected state, that the present transmission link cannot support the service of the present service scenario of the UE, the UE may further be triggered to enter the cell selection process from a software layer through an operating system or a specific application.

The service scenario involved in the service interaction process includes, but not limited to, a video of instant messaging software, a ping test, and/or a game scenario. The instant messaging software includes, but not limited to, WeChat, MicroBlog, Facebook, etc.

The parameter value includes, but not limited to, the UL grant, the BSR, the QoS, the SNR, the QCI, and/or the like.

Exemplarily, the UE detects in a ping test that signal strength of a reference signal transmitted by a base station is high, but a result of the ping test may be influenced if a network side allocates relatively few downlink resources and/or UL resources to the UE. In such case, cell selection of the UE may be triggered from the software layer through the operating system, the specific application, etc.

Figure 5:
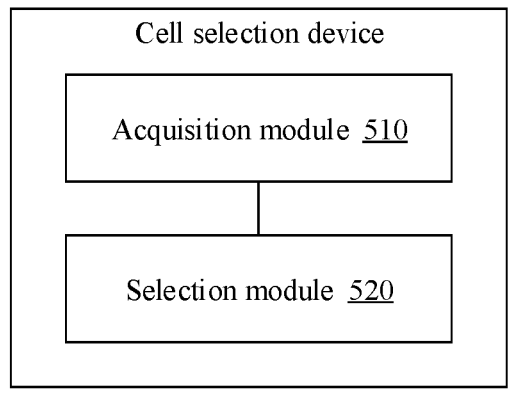
FIG. 5 is a structure diagram of a cell selection device, according to an exemplary embodiment.

As illustrated in FIG. 5, an embodiment of the disclosure provides a cell selection device. The device is applied to UE, and includes an acquisition module 510 and a selection module 520.

The acquisition module 510 is configured to acquire a parameter value of a transmission link allocated to the UE by a network side.

The selection module 520 is configured to trigger cell selection of the UE responsive to determining, according to the parameter value, that the transmission link allocated to the UE does not support a transmission requirement of a present service scenario of the UE.

In some embodiments, the acquisition module 510 and the selection module 520 may be program modules. The program modules, after executed by a processor, may acquire the parameter value of the transmission link allocated to the UE, and trigger cell selection of the UE when it is determined that the presently allocated transmission link cannot support the transmission requirement of the present service scenario of the UE.

In an embodiment, the acquisition module 510 and the selection module 520 may be combined software and hardware modules. The combined software and hardware module includes, but not limited to, a field programmable array or a complex programmable logic array.

In another embodiment, in an embodiment, the acquisition module 510 and the selection module 520 may be pure hardware modules. The pure hardware module includes, but not limited to, an application specific integrated circuit (ASIC).

In an embodiment, the transmission link includes a UL and a downlink; and the selection module 520 is specifically configured to, responsive to determining, according to the parameter value, that at least one of the UL or the downlink allocated to the UE does not support the transmission requirement of the present service scenario of the UE, trigger cell selection of the UE.

In an embodiment, the acquisition module 510 is specifically configured to acquire at least one of: a parameter value of the downlink allocated to the UE by the network side, or a parameter value of the UL allocated to the UE by the network side.

In an embodiment, the parameter value of the downlink includes at least one of: RSRP of the downlink; an SNR of the downlink; or a bit error rate of the downlink.

In an embodiment, the parameter value of the UL includes at least one of: a UL grant of the UL; a BSR to be transmitted through the UL; a CQI of the UL; a link loss of the UL; or an MCS of the UL.

In an embodiment, the device further includes a first determination module and a second determination module.

The first determination module is configured to determine whether reference signal strength of a serving cell of the UE meets a first triggering condition.

The second determination module is configured to, responsive to that the reference signal strength of the serving cell of the UE does not meet the first triggering condition, determine to execute a second triggering condition; and the second triggering condition is a triggering condition of determining whether to trigger the UE to perform cell selection based on the parameter value.

In an embodiment, the second determination module is configured to, responsive to that the reference signal strength of the serving cell of the UE does not meet the first triggering condition and the present service scenario of the UE is a preset service scenario, determine to execute the second triggering condition.

In an embodiment, the device further includes: a third determination module, configured to, responsive to that the present service scenario of the UE is not the preset service scenario, determine to execute the first triggering condition.

In an embodiment, the preset service scenario includes at least one of the following: the UE has started an application in a preset application list; the UE has activated a function in a preset function list; or a preset phenomenon that the transmission requirement of the present service scenario is not met occurs during present running of the UE.

In an embodiment, the preset phenomenon that the transmission requirement of the present service scenario is not met occurring during present running of the UE includes at least one of the following: a buffer queue of a present data packet to be transmitted of the UE is full; a packet loss phenomenon occurs to the buffer queue of the present data packet to be transmitted of the UE; the packet loss phenomenon occurs when the UE receives a data packet; a transmission delay of a data packet transmitted by the UE reaches a preset delay value; or a nonfluency phenomenon occurs when a UI of the UE is switched.

In an embodiment, the device further includes: a triggering module, configured to, responsive to that reference signal quality of the serving cell of the UE does not support the first triggering condition, trigger cell selection of the UE.

In an embodiment, the device further includes: a fourth determination module, configured to determine the transmission requirement of the present service scenario of the UE according to preset information.

The preset information includes at least one of: present running information of the present service scenario; historical running information of the present service scenario; operational behavior information in the present service scenario; or attribute information of the present service scenario, the attribute information at least including an application type of an application corresponding to the present service scenario.

An embodiment of the disclosure also provides UE, which may be first equipment. The first equipment includes a wireless module and a processor.

The wireless module is configured to send and receive wireless signals.

The processor is coupled to the wireless module and configured to execute computer-executable instructions to control the wireless module to send and receive wireless signals and execute the cell selection method provided in any abovementioned technical solutions.

Figure 6:
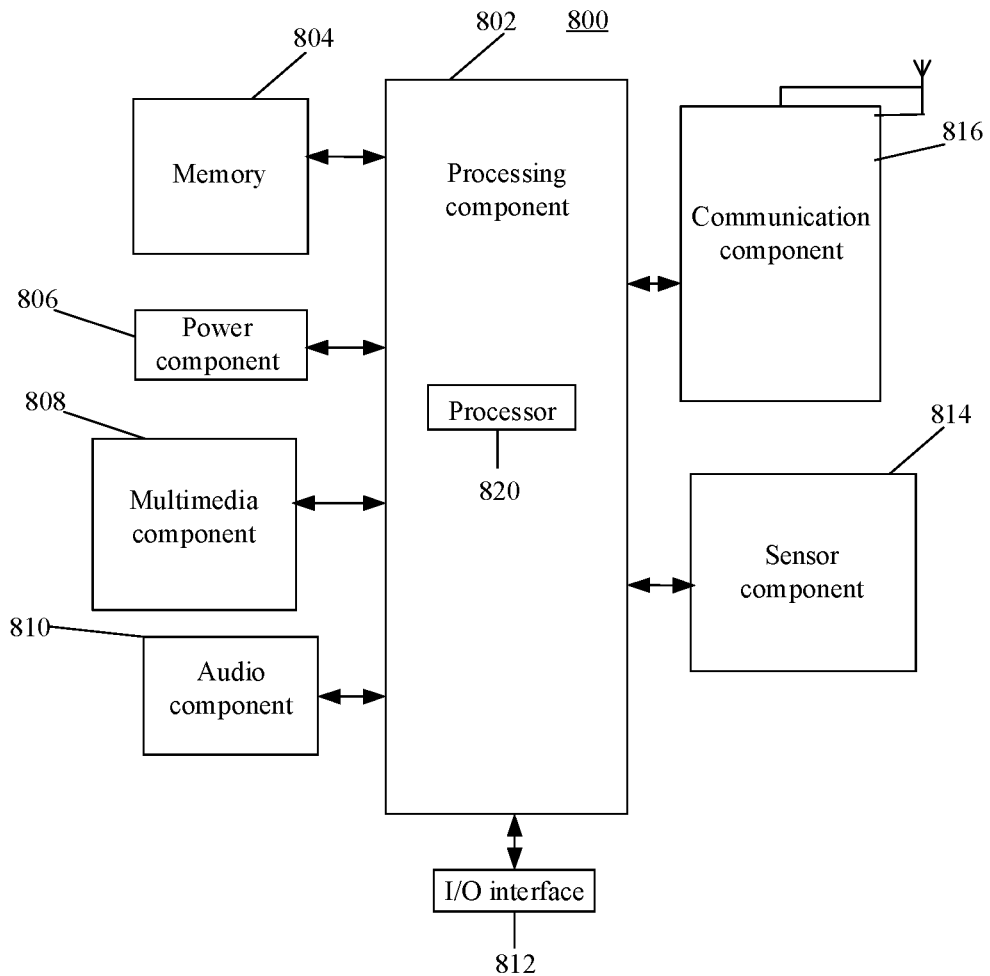
FIG. 6 is a structure diagram of UE, according to an exemplary embodiment.

FIG. 6 is a block diagram of mobile UE 800, according to an exemplary embodiment. For example, the UE 800 may be a mobile phone, a mobile computer, and the like.

Referring to FIG. 6, the UE 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the UE 800. The power component 806 may include a power management system, one or more power supplies, and other components associated with generation, management and distribution of power for the UE 800.

The multimedia component 808 includes a screen providing an output interface between the UE 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the UE 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the UE 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the UE 800. For instance, the sensor component 814 may detect an on/off status of the UE 800 and relative positioning of components, such as a display and small keyboard of the UE 800, and the sensor component 814 may further detect a change in a position of the UE 800 or a component of the UE 800, presence or absence of contact between the user and the UE 800, orientation or acceleration/deceleration of the UE 800 and a change in temperature of the UE 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the UE 800 and other devices. The UE 800 may access a communication-standard-based wireless network, such as a wireless fidelity (WiFi) network, a 2nd-generation (2G) or 3rd-generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the UE 800 may be implemented by one or more ASICs, digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned methods.

In an exemplary embodiment, there is also provided a non-transitory computer-readable storage medium including instructions, such as included in the memory 804, executable by the processor 820 of the UE 800 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

An embodiment of the disclosure provides a non-transitory computer-readable storage medium. When instructions in the storage medium are executed by a processor of UE, the UE may execute a cell selection method provided in any abovementioned embodiments, and for example, may execute at least one of the methods illustrated in any one of FIG. 1 to FIG. 4.

The cell selection method may include: a parameter value of a transmission link allocated to the UE by a network side is acquired; and responsive to determining, according to the parameter value, that the transmission link allocated to the UE does not support a transmission requirement of a present service scenario of the UE, cell selection of the UE is triggered.

It can be understood that the transmission link includes a UL and a downlink; and the operation that cell selection of the UE is triggered responsive to determining, according to the parameter value, that the transmission link allocated to the UE does not support the transmission requirement of the present service scenario of the UE includes: responsive to determining, according to the parameter value, that at least one of the UL or the downlink allocated to the UE does not support the transmission requirement of the present service scenario of the UE, cell selection of the UE is triggered.

It can be understood that the operation that a resource parameter allocated to the UE by the network side is acquired includes acquiring at least one of: a parameter value of a downlink allocated to the UE by the network side, or a parameter value of a UL allocated to the UE by the network side.

It can be understood that the parameter value of the downlink includes at least one of: RSRP of the downlink; an SNR of the downlink; or a bit error rate of the downlink.

It can be understood that the parameter value of the UL includes at least one of: a UL grant of the UL; a BSR to be transmitted through the UL; a CQI of the UL; a link loss of the UL; or an MCS of the UL.

It can be understood that the method further includes: whether reference signal strength of a serving cell of the UE meets a first triggering condition is determined; and responsive to that the reference signal strength of the serving cell of the UE does not meet the first triggering condition, a second triggering condition is determined to be executed, and the second triggering condition is a triggering condition of determining whether to trigger the UE to perform cell selection based on the parameter value.

It can be understood that the operation that the second triggering condition is determined to be executed responsive to that the reference signal strength of the serving cell of the UE does not meet the first triggering condition includes: responsive to that the reference signal strength of the serving cell of the UE does not meet the first triggering condition and the present service scenario of the UE is a preset service scenario, the second triggering condition is determined to be executed.

It can be understood that the method further includes: responsive to that the present service scenario of the UE is not the preset service scenario, the first triggering condition is determined to be executed.

It can be understood that the preset service scenario includes at least one of the following: the UE has started an application in a preset application list; the UE has activated a function in a preset function list; or a preset phenomenon that the transmission requirement of the present service scenario is not met occurs during present running of the UE.

It can be understood that: the preset phenomenon that the transmission requirement of the present service scenario is not met occurring during present running of the UE includes at least one of the following: a buffer queue of a present data packet to be transmitted of the UE is full; a packet loss phenomenon occurs to the buffer queue of the present data packet to be transmitted of the UE; the packet loss phenomenon occurs when the UE receives a data packet; a transmission delay of a data packet transmitted by the UE reaches a preset delay value; a nonfluency phenomenon occurs when a UI of the UE is switched; or the nonfluency phenomenon occurs when multimedia information is played through a play window in the UI of the UE.

It can be understood that the method further includes: responsive to that reference signal quality of the serving cell of the UE does not support the first triggering condition, cell selection of the UE is triggered.

It can be understood that the method further includes: the transmission requirement of the present service scenario of the UE is determined according to preset information. The preset information includes at least one of: present running information of the present service scenario; historical running information of the present service scenario; operational behavior information in the present service scenario; or attribute information of the present service scenario, the attribute information at least including an application type of an application corresponding to the present service scenario.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A cell selection method, applied to user equipment (UE), comprising:
    determining whether reference signal strength of a serving cell of the UE meets a first triggering condition;
    determining to execute a second triggering condition responsive to that the reference signal strength of the serving cell of the UE does not meet the first triggering condition; wherein the second triggering condition of determining whether to trigger the UE to perform cell selection based on a parameter value of a transmission link allocated to the UE by a network side;
    acquiring the parameter value of the transmission link allocated to the UE by the network side; and
    triggering cell selection of the UE responsive to determining, according to the parameter value, that the transmission link allocated to the UE does not support a transmission requirement of a present service scenario of the UE,
    wherein triggering the cell selection of the UE responsive to determining, according to the parameter value, that the transmission link allocated to the UE does not support the transmission requirement of the present service scenario of the UE comprises:
    triggering the cell selection of the UE responsive to determining, according to the parameter value, at least one of following:
    a transmission resource of the transmission link allocated to the UE not supporting a resource quantity required by transmission of the present service scenario of the UE; or
    transmission quality of the transmission link allocated to the UE not supporting quality of service (QoS) of the present service scenario of the UE.

2. The method of claim 1, wherein the transmission link comprises an uplink (UL) and a downlink;
    wherein the triggering cell selection of the UE responsive to determining, according to the parameter value, that the transmission link allocated to the UE does not support the transmission requirement of the present service scenario of the UE comprises:
    triggering cell selection of the UE responsive to determining, according to the parameter value, that at least one of the UL or the downlink allocated to the UE does not support the transmission requirement of the present service scenario of the UE.

3. The method of claim 1, wherein acquiring a resource parameter allocated to the UE by the network side comprises acquiring at least one of:
    a parameter value of a downlink allocated to the UE by the network side; or
    a parameter value of an uplink (UL) allocated to the UE by the network side;
    wherein the parameter value of the downlink comprises at least one of following parameters: reference signal received power (RSRP) of the downlink; a signal to noise ratio (SNR) of the downlink; or a bit error rate of the downlink;
    wherein the parameter value of the UL comprises at least one of following parameters: a UL grant of the UL; a buffer size report (BSR) to be transmitted through the UL; a channel quality indication (CQI) of the UL; a link loss of the UL; or a modulation and coding scheme (MCS) of the UL.

4. The method of claim 1, wherein the determining to execute the second triggering condition responsive to that the reference signal strength of the serving cell of the UE does not meet the first triggering condition comprises:
    determining to execute the second triggering condition responsive to that the reference signal strength of the serving cell of the UE does not meet the first triggering condition and the present service scenario of the UE is a preset service scenario.

5. The method of claim 4, further comprising:
    determining to execute the first triggering condition responsive to that the present service scenario of the UE is not the preset service scenario.

6. The method of claim 4, wherein the preset service scenario comprises at least one of following scenarios:
    the UE has started an application in a preset application list;
    the UE has activated a function in a preset function list; or
    a preset phenomenon that the transmission requirement of the present service scenario is not met occurs during present running of the UE.

7. The method of claim 6, wherein the preset phenomenon comprises at least one of following events:

a buffer queue of a present data packet to be transmitted of the UE is full;

a packet loss phenomenon occurs to the buffer queue of the present data packet to be transmitted of the UE;

the packet loss phenomenon occurs when the UE receives a data packet;

a transmission delay of a data packet transmitted by the UE reaches a preset delay value;

a nonfluency phenomenon occurs when a user interface (UI) of the UE is switched; or the nonfluency phenomenon occurs when multimedia information is played through a play window in the UI of the UE.

8. The method of claim 1, further comprising:
triggering cell selection of the UE responsive to that reference signal quality of the serving cell of the UE does not support the first triggering condition.

9. The method of claim 1, further comprising:
determining the transmission requirement of the present service scenario of the UE according to preset information;
wherein the preset information comprises at least one of following data:
present running information of the present service scenario;
historical running information of the present service scenario;
operational behavior information in the present service scenario; or
attribute information of the present service scenario, the attribute information at least comprising an application type of an application corresponding to the present service scenario.

10. A cell selection device, applied to a user equipment (UE), comprising:
a processor; and
a memory for storing instructions executable by the processor;
wherein the processor is configured to:
determine whether reference signal strength of a serving cell of the UE meets a first triggering condition;
determine to execute a second triggering condition responsive to that the reference signal strength of the serving cell of the UE does not meet the first triggering condition; wherein the second triggering condition of determining whether to trigger the UE to perform cell selection based on a parameter value of a transmission link allocated to the UE by a network side;
acquire the parameter value of the transmission link allocated to the UE by the network side; and
trigger cell selection of the UE responsive to determining, according to the parameter value, that the transmission link allocated to the UE does not support a transmission requirement of a present service scenario of the UE,
wherein the processor is further configured to trigger the cell selection of the UE responsive to determining, according to the parameter value, at least one of following:
a transmission resource of the transmission link allocated to the UE not supporting a resource quantity required by transmission of the present service scenario of the UE; or
transmission quality of the transmission link allocated to the UE not supporting quality of service (QoS) of the present service scenario of the UE.

11. The device of claim 10, wherein the transmission link comprises an uplink (UL) and a downlink;

wherein the processor is specifically configured to trigger cell selection of the UE responsive to determining, according to the parameter value, that at least one of the UL or the downlink allocated to the UE does not support the transmission requirement of the present service scenario of the UE.

12. The device of claim 10, wherein the processor is specifically configured to acquire at least one of: a parameter value of a downlink allocated to the UE by the network side, or a parameter value of an uplink (UL) allocated to the UE by the network side;
wherein the parameter value of the downlink comprises at least one of following parameters: reference signal received power (RSRP) of the downlink; a signal to noise ratio (SNR) of the downlink; or a bit error rate of the downlink;
wherein the parameter value of the UL comprises at least one of following parameters: a UL grant of the UL; a buffer size report (BSR) to be transmitted through the UL; a channel quality indication (CQI) of the UL; a link loss of the UL; or a modulation and coding scheme (MCS) of the UL.

13. The device of claim 10, wherein the processor is configured to determine to execute the second triggering condition responsive to that the reference signal strength of the serving cell of the UE does not meet the first triggering condition and the present service scenario of the UE is a preset service scenario.

14. The device of claim 13, wherein the processor is further configured to:
determine to execute the first triggering condition responsive to that the present service scenario of the UE is not the preset service scenario.

15. The device of claim 13, wherein the preset service scenario comprises at least one of following scenarios:
the UE has started an application in a preset application list;
the UE has activated a function in a preset function list; or
a preset phenomenon that the transmission requirement of the present service scenario is not met occurs during present running of the UE.

16. The device of claim 15, wherein the preset phenomenon comprises at least one of following events:
a buffer queue of a present data packet to be transmitted of the UE is full;
a packet loss phenomenon occurs to the buffer queue of the present data packet to be transmitted of the UE;
the packet loss phenomenon occurs when the UE receives a data packet;
a transmission delay of a data packet transmitted by the UE reaches a preset delay value; or
a nonfluency phenomenon occurs when a user interface (UI) of the UE is switched.

17. The device of claim 10, wherein the processor is further configured to:
trigger cell selection of the UE responsive to that reference signal quality of the serving cell of the UE does not support the first triggering condition.

18. The device of claim 10, wherein the processor is further configured to:
determine the transmission requirement of the present service scenario of the UE according to preset information;
wherein the preset information comprises at least one of following data:

present running information of the present service scenario;
historical running information of the present service scenario;
operational behavior information in the present service scenario; or
attribute information of the present service scenario, the attribute information at least comprising an application type of an application corresponding to the present service scenario.

* * * * *